(12) United States Patent
Zheng et al.

(10) Patent No.: US 11,335,979 B2
(45) Date of Patent: *May 17, 2022

(54) SECONDARY BATTERY

(71) Applicant: CONTEMPORARY AMPEREX TECHNOLOGY CO., LIMITED, Ningde (CN)

(72) Inventors: Yulian Zheng, Ningde (CN); Chengyou Xing, Ningde (CN); Peng Wang, Ningde (CN); Taosheng Zhu, Ningde (CN); Fenggang Zhao, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 204 days.

This patent is subject to a terminal disclaimer.

(21) Appl. No.: 16/708,216

(22) Filed: Dec. 9, 2019

(65) Prior Publication Data

US 2020/0119328 A1 Apr. 16, 2020

Related U.S. Application Data

(63) Continuation of application No. 15/917,296, filed on Mar. 9, 2018, now Pat. No. 10,573,872.

(30) Foreign Application Priority Data

Apr. 7, 2017 (CN) .......................... 201710223760.2

(51) Int. Cl.
*H01M 4/00* (2006.01)
*H01M 50/538* (2021.01)
(Continued)

(52) U.S. Cl.
CPC ..... *H01M 50/538* (2021.01); *H01M 10/0431* (2013.01); *H01M 50/148* (2021.01);
(Continued)

(58) Field of Classification Search
CPC .. H01M 50/538; H01M 50/529; H01M 50/50; H01M 50/531; H01M 50/543; H01M 50/155; H01M 50/148; H01M 10/0431
See application file for complete search history.

(56) References Cited

FOREIGN PATENT DOCUMENTS

| CN | 105322213 A | 2/2016 |
|---|---|---|
| CN | 206742364 U | 12/2017 |

(Continued)

OTHER PUBLICATIONS

Contemporary Amperex Technology Co.,Limited, Extended European Search Report, EP18162007.1, dated May 11, 2018, 7 pgs.

(Continued)

*Primary Examiner* — Jane J Rhee
(74) *Attorney, Agent, or Firm* — Morgan, Lewis & Bockius LLP

(57) ABSTRACT

The present disclosure provides a secondary battery which comprises a cap plate, an electrode assembly and a first protecting piece. The cap plate comprises a first electrode terminal. The electrode assembly comprises a main body and a first electrode tab. The first electrode tab is electrically connected with the first electrode terminal. The first electrode tab includes a first connecting portion and a first bending portion, the first connecting portion is electrically connected with the first electrode terminal, and the first bending portion connects the main body and the first connecting portion. The first protecting piece is fixed to a bottom of the first connecting portion. The first protecting piece includes a main portion and a first curve portion, the first curve portion is connected with the main portion and is (Continued)

curved relative to the main portion. The first bending portion is bent downwardly along the first curve portion.

15 Claims, 5 Drawing Sheets

(51) Int. Cl.
*H01M 50/50* (2021.01)
*H01M 50/148* (2021.01)
*H01M 50/155* (2021.01)
*H01M 50/529* (2021.01)
*H01M 50/531* (2021.01)
*H01M 50/543* (2021.01)
*H01M 10/04* (2006.01)

(52) U.S. Cl.
CPC ......... *H01M 50/155* (2021.01); *H01M 50/50* (2021.01); *H01M 50/529* (2021.01); *H01M 50/531* (2021.01); *H01M 50/543* (2021.01)

(56) References Cited

FOREIGN PATENT DOCUMENTS

| | | |
|---|---|---|
| CN | 206878046 U | 1/2018 |
| EP | 2541650 A1 | 1/2013 |
| EP | 2581968 A1 | 4/2013 |
| WO | WO-2015/143936 A1 | 10/2015 |

OTHER PUBLICATIONS

English Translation of WO2015143936 (Year: 2015), Jiangsu Huadong Institute of Li-Ion Battery Co Ltd, 11 pgs.

Yulian Zheng et al, Non-Final office action, U.S. Appl. No. 15/917,296, dated Apr. 29, 2019, 9 pgs.

Yulian Zheng et al, Final office action, U.S. Appl. No. 15/917,296, dated Sep. 16, 2019, 5 pgs.

Yulian Zheng et al, Notice of Allowance, U.S. Appl. No. 15/917,296, dated Nov. 4, 2019, 5 pgs.

SECONDARY BATTERY

RELATED APPLICATIONS

The present application is a continuation of U.S. patent application Ser. No. 15/917,296, filed on Mar. 9, 2018, entitled "SECONDARY BATTERY", which claims priority to Chinese patent application No. 201710223760.2, filed on Apr. 7, 2017, entitled "SECONDARY BATTERY" all of which are hereby incorporated herein by reference in their entirety.

FIELD OF THE PRESENT DISCLOSURE

The present disclosure relates to the field of battery, and particularly relates to a secondary battery.

BACKGROUND OF THE PRESENT DISCLOSURE

The existing secondary battery generally comprises an electrode assembly, a case and a cap plate, the electrode assembly is received in the case, the cap plate is assembled with the case, and an electrode tab of the electrode assembly is electrically connected with an electrode terminal provided on the cap plate. In order to ensure a connection strength between the electrode tab and the electrode terminal, the electrode tab needs to have a sufficient large length, and a protecting piece needs to be provided below the electrode tab; in order to reduce the space occupied by the electrode tab, the electrode tab needs to be bent to two layers along an end portion of the protecting piece, which will lead to a contact between the electrode tab and the end portion of the protecting piece; because the electrode tab is thin and a burr is generated in the end portion of the protecting piece during stamping process of the protecting piece, in the production process and the working process of the secondary battery, the electrode tab will be easily pierced by the burr in the end portion of the protecting piece when the secondary battery is dropped, which leads to short circuit of the electrode assembly or circuit interruption of the electrode assembly, and decreases the safety performance of the secondary battery.

SUMMARY OF THE PRESENT DISCLOSURE

The present disclosure provides a secondary battery, which comprises a cap plate, an electrode assembly, a case and a first protecting piece. The cap plate comprises a first electrode terminal and a second electrode terminal. The electrode assembly comprises a main body, a first electrode tab and a second electrode tab, the first electrode tab and the second electrode tab are provided to the main body and opposite in electrical polarity. The main body of the electrode assembly comprises a positive electrode plate, a negative electrode plate and a separator provided between the positive electrode plate and the negative electrode plate, the first electrode tab is electrically connected with the first electrode terminal, and the second electrode tab is electrically connected with the second electrode terminal. The case receives the electrode assembly and is assembled with the cap plate. The first electrode tab includes a first connecting portion and a first bending portion, the first connecting portion is electrically connected with the first electrode terminal, and the first bending portion connects the main body of the electrode assembly and the first connecting portion. The first protecting piece is fixed to a bottom of the first connecting portion. The first protecting piece includes a main portion and a first curve portion, the first curve portion is connected with an outer end of the main portion in a width direction and is curved relative to the main portion. The first bending portion is bent downwardly along an outer wall of the first curve portion.

In the secondary battery according to the present disclosure, the first protecting piece is provided with the first curve portion and the first bending portion is bent downwardly along the curved outer wall of the first curve portion, so the first bending portion will not contact a burr in an end portion of the first protecting piece, in a production process and a working process of the secondary battery, the first bending portion will not be pierced by the curved outer wall of the first curve portion, thereby avoiding short circuit of the electrode assembly or circuit interruption of the electrode assembly, improving the safety performance of the secondary battery.

Figure 1:
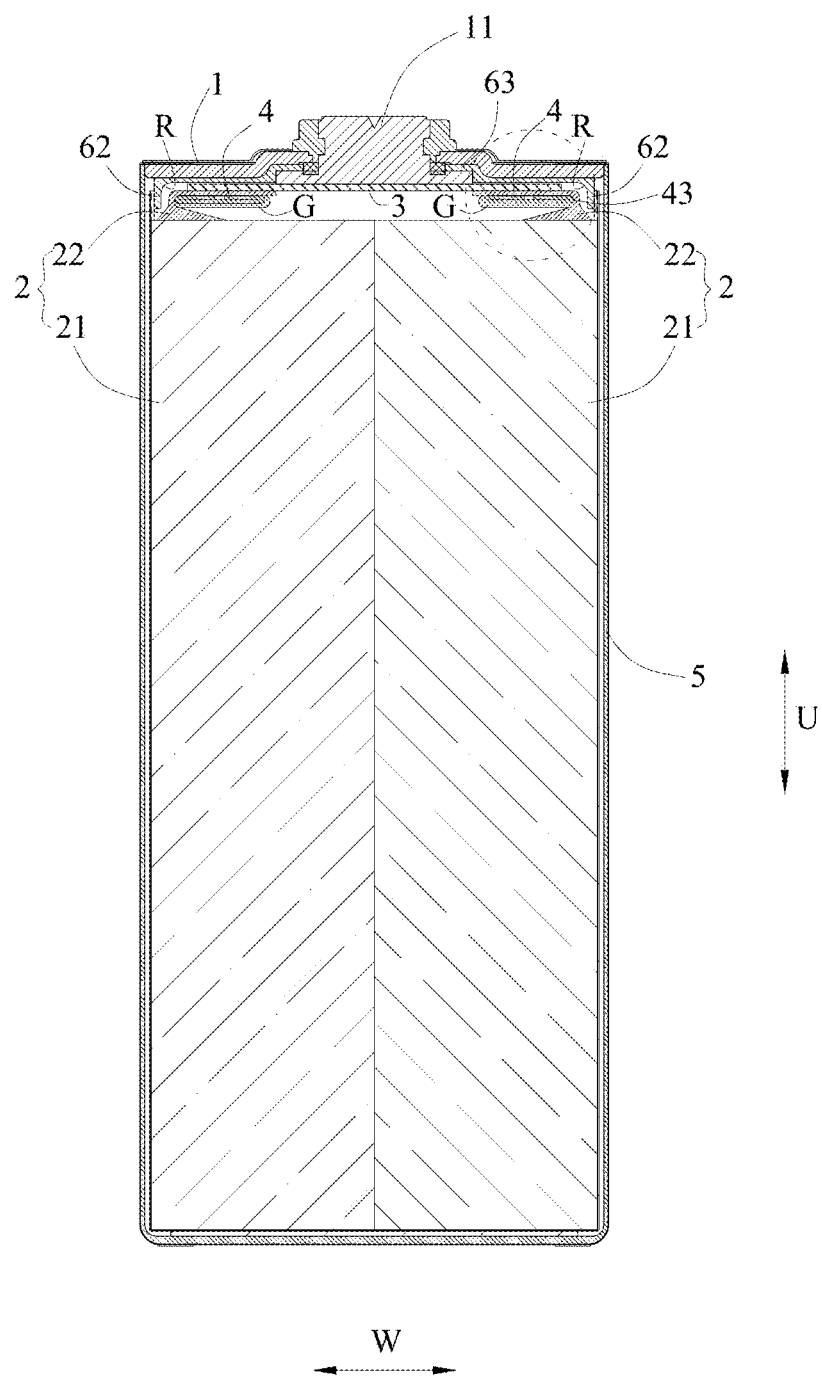
FIG. 1 is a schematic view of a secondary battery according to the present disclosure.

Reference numerals in figures are represented as follows:
1 cap plate
  11 first electrode terminal
  12 second electrode terminal
2 electrode assembly
  21 main body
    211 upper surface
  22 first electrode tab
    221 first connecting portion
    222 first bending portion
  23 second electrode tab
3 first connecting piece
4 first protecting piece
  41 main portion
  42 first folding portion
  43 first curve portion
  44 second curve portion
  45 second folding portion
5 case
6 insulating frame
  61 first side edge
  62 second side edge
  63 base portion
R rounded corner
G insulating adhesive
W width direction U up-down direction
L length direction

DETAILED DESCRIPTION

Hereinafter a secondary battery according to the present disclosure will be described in detail in combination with the figures.

Figure 5:
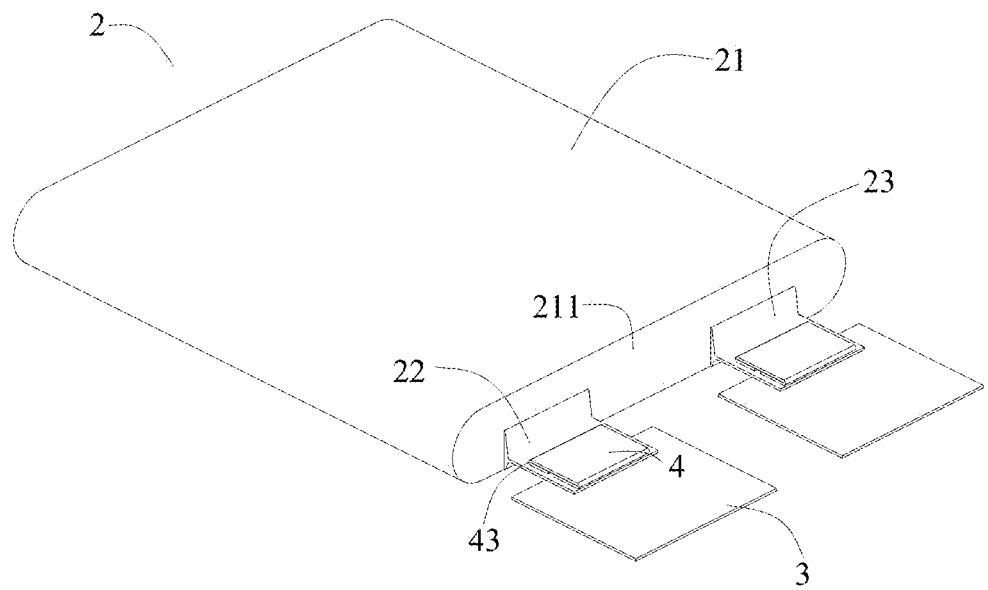
FIG. 5 is a schematic view of an electrode assembly, a first connecting piece and a first protecting piece of the secondary battery according to the present disclosure.
Figure 6:
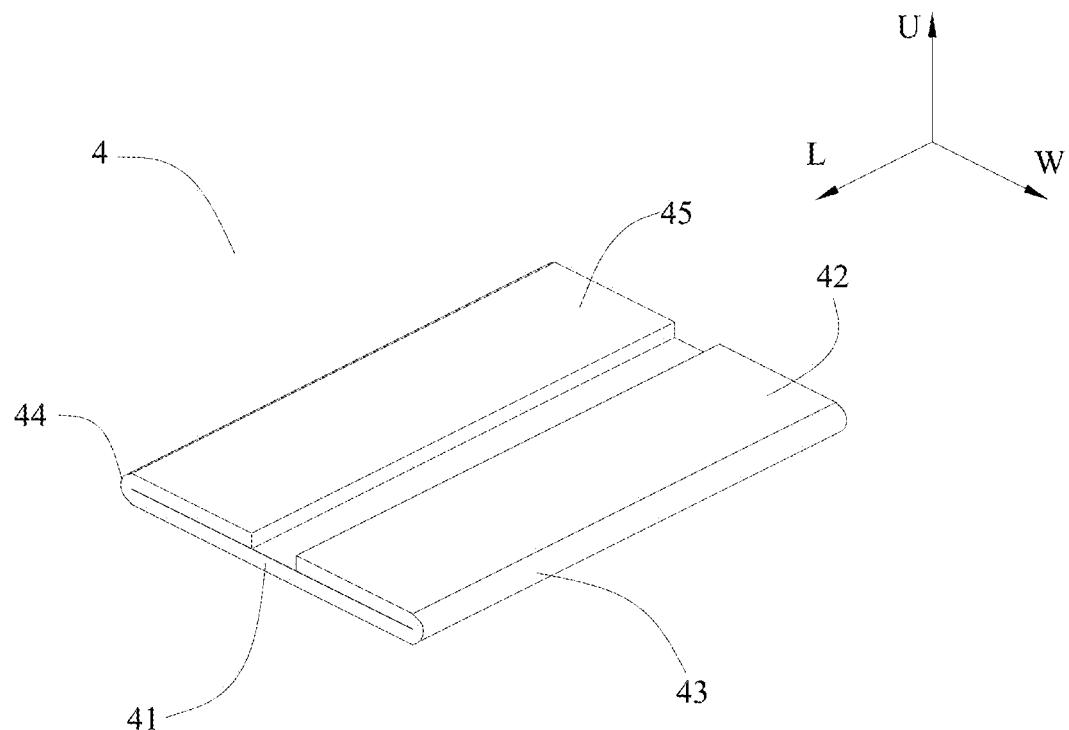
FIG. 6 is a schematic view of an embodiment of the first protecting piece of the secondary battery according to the present disclosure.
Figure 7:
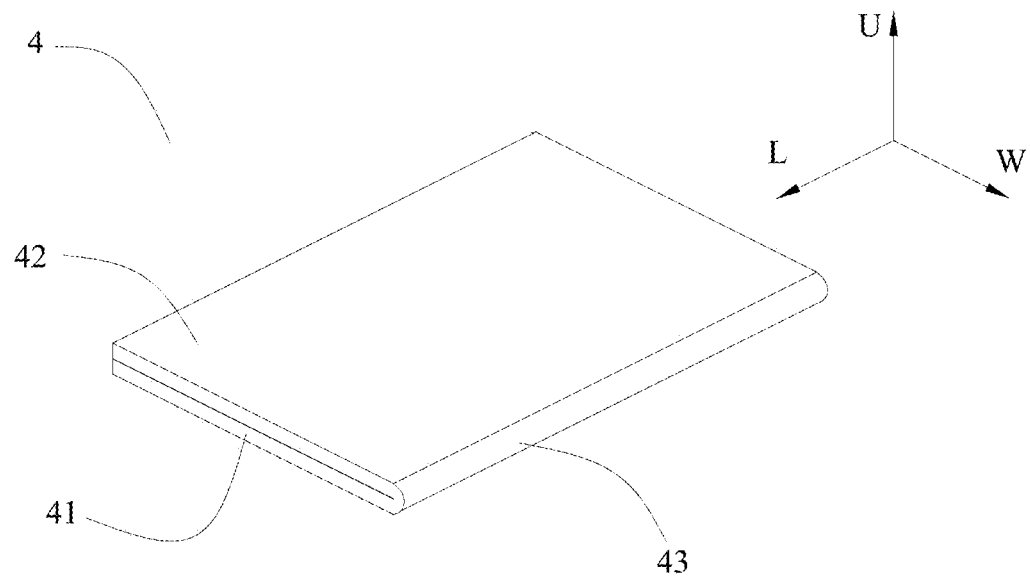
FIG. 7 is a schematic view of another embodiment of the first protecting piece of the secondary battery according to the present disclosure.
Figure 8:
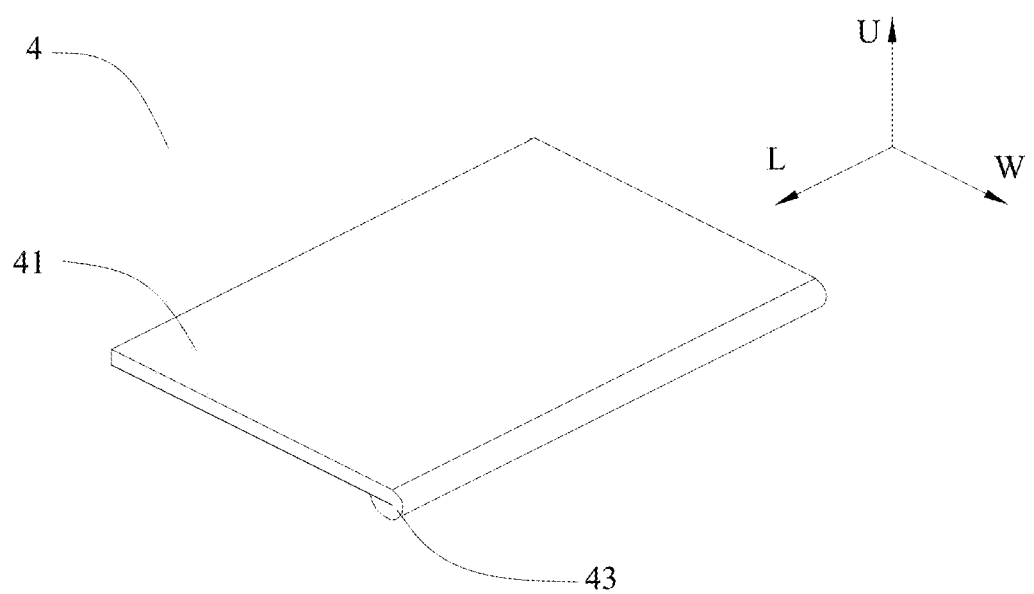
FIG. 8 is a schematic view of still another embodiment of the first protecting piece of the secondary battery according to the present disclosure.

Referring to FIGS. 1-8, a secondary battery according to the present disclosure comprises a cap plate 1, an electrode assembly 2, a first connecting piece 3 and a first protecting piece 4. The cap plate 1 comprises a first electrode terminal 11. The electrode assembly 2 comprises a main body 21, a first electrode tab 22 and a second electrode tab 23, the first electrode tab 22 and the second electrode tab 23 are provided to the main body 21 and opposite in electrical polarity. The first connecting piece 3 is connected in series between the first electrode tab 22 and the first electrode terminal 11. The first electrode tab 22 includes a first connecting portion 221 and a first bending portion 222, the first connecting portion 221 is provided below the first connecting piece 3, and the first bending portion 222 connects the main body 21 of the electrode assembly 2 and the first connecting portion 221. The first protecting piece 4 is fixed to a bottom of the first connecting portion 221 and includes a main portion 41 and a first curve portion 43, the first curve portion 43 is connected with an outer end of the main portion 41 in a width direction W and is curved relative to the main portion 41. The first bending portion 222 is bent downwardly along a curved outer wall of the first curve portion 43. Referring to FIGS. 6-8, at least a part of the outer wall of the first curve portion 43 is curve.

In the secondary battery according to the present disclosure, the first protecting piece 4 is provided with the first curve portion 43 and the first bending portion 222 is bent downwardly along the curved outer wall of the first curve portion 43, so the first bending portion 222 will not contact a burr in an end portion of the first protecting piece 4, in a production process and a working process of the secondary battery, the first bending portion 222 will not be pierced by the curved outer wall of the first curve portion 43, thereby avoiding short circuit of the electrode assembly 2 or circuit interruption of the electrode assembly 2, improving the safety performance of the secondary battery.

Figure 3:
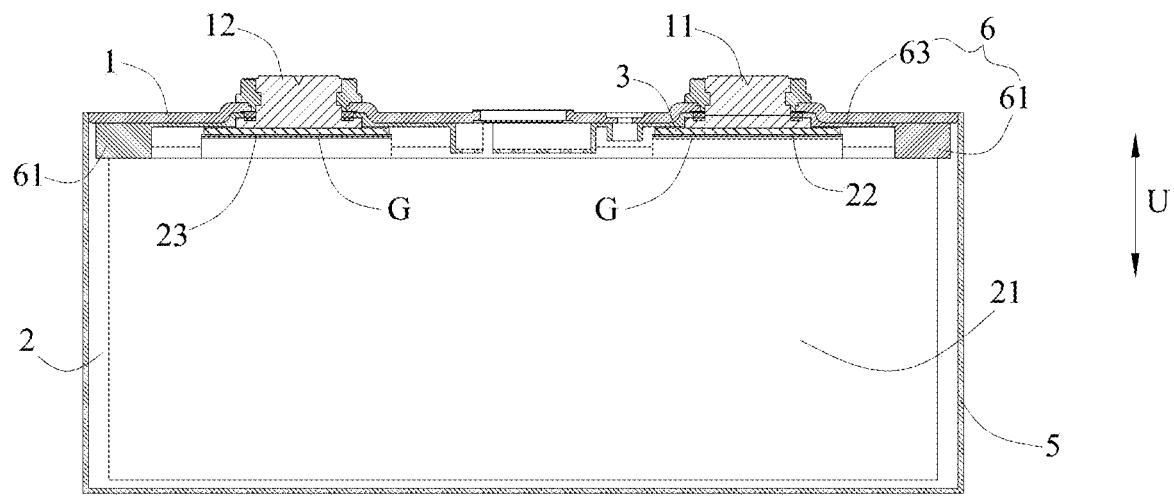
FIG. 3 is another schematic view of the secondary battery according to the present disclosure.
Figure 4:
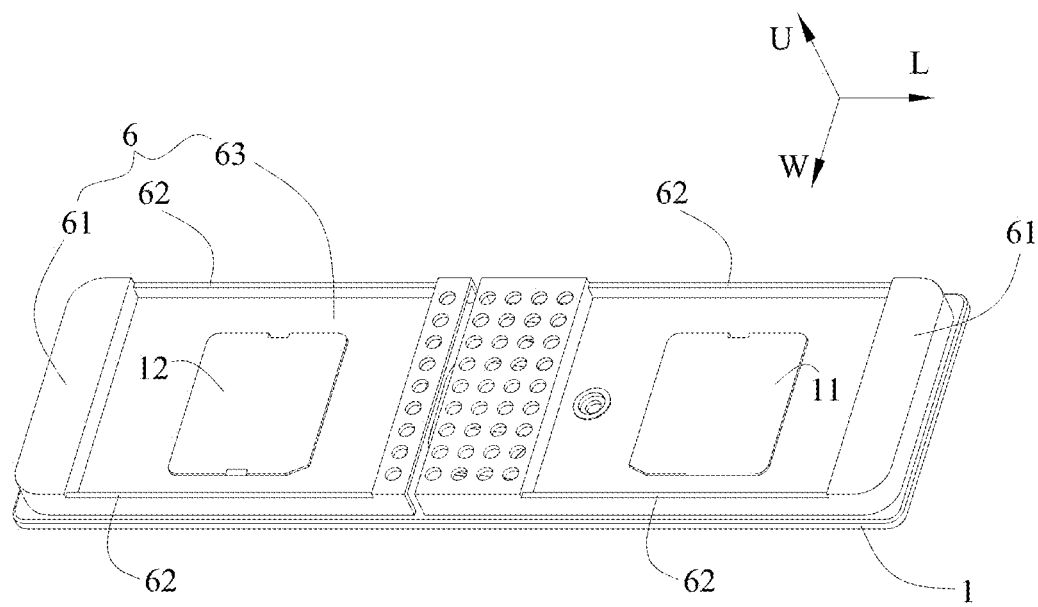
FIG. 4 is a schematic view of a cap plate and an insulating frame of the secondary battery according to the present disclosure.

In the secondary battery according to the present disclosure, referring to FIG. 3, the cap plate 1 further comprises a second electrode terminal 12 electrically connected with the second electrode tab 23.

Figure 2:
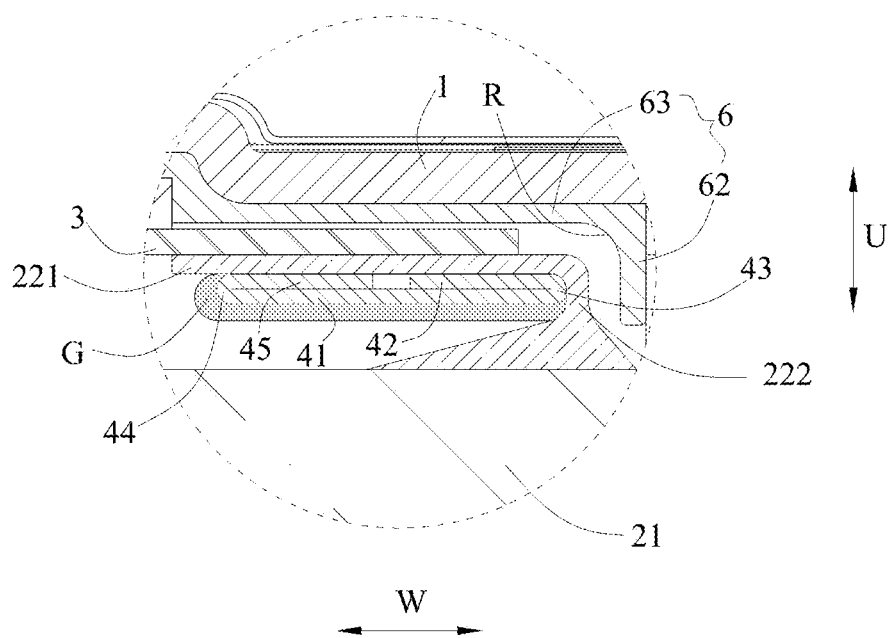
FIG. 2 is an enlarged view of a part surrounded by a dotted circle shown in FIG. 1.

In the secondary battery according to the present disclosure, referring to FIG. 2, FIG. 6 and FIG. 7, the first protecting piece 4 further includes a first folding portion 42 folded back onto the main portion 41, and the first curve portion 43 connects the main portion 41 and the first folding portion 42, the first folding portion 42, the first curve portion 43 and the main portion 41 form a U-shaped structure. In an embodiment, referring to FIG. 7, a width of the first folding portion 42 is equal to a width of the main portion 41 in the width direction W. The U-shaped structure is used to generally describe a shape formed by the first folding portion 42, the first curve portion 43 and the main portion 41, the first folding portion 42 can be flush with the main portion 41 (referring to FIG. 7, the width of the first folding portion 42 is equal to the width of the main portion 41 in the width direction W) or shorter than the main portion 41 (referring to FIG. 6, the width of the first folding portion 42 is smaller than the width of the main portion 41 in the width direction W).

In the secondary battery according to the present disclosure, referring to FIG. 2 and FIG. 6, the first protecting piece 4 further includes a second curve portion 44 and a second folding portion 45, the second curve portion 44 is connected with an inner end of the main portion 41 in the width direction W and is curved relative to the main portion 41; the second folding portion 45 is folded back onto the main portion 41, and the second curve portion 44 connects the main portion 41 and the second folding portion 45; the second folding portion 45, the second curve portion 44 and the main portion 41 form a U-shaped structure, the second folding portion 45 and the first folding portion 42 are positioned at a side of the main portion 41 in an up-down direction U. The U-shaped structure is used to generally describe a shape formed by the second folding portion 45, the second curve portion 44 and the main portion 41, the second folding portion 45 can be flush with the main portion 41 or shorter than the main portion 41 (referring to FIG. 6, a width of the second folding portion 45 is smaller than the width of the main portion 41 the width direction W).

In the secondary battery according to the present disclosure, referring to FIG. 6, the first folding portion 42 and the second folding portion 45 are symmetric about a plane formed by the up-down direction U and a length direction L; the first curve portion 43 and the second curve portion 44 are symmetric about the plane formed the up-down direction U and the length direction L. The first protecting piece 4 in this symmetric structure can have a foolproof function.

In the secondary battery according to the present disclosure, referring to FIG. 3, the secondary battery further comprises a case 5 and an insulating frame 6, the case 5 receives the electrode assembly 2 and is assembled with the cap plate 1, the insulating frame 6 is received in the case 5 and provided below the cap plate 1, the insulating frame 6 includes a base portion 63. Referring to FIG. 5, the main body 21 of the electrode assembly 2 comprises a positive electrode plate, a negative electrode plate and a separator provided between the positive electrode plate and the negative electrode plate, the positive electrode plate, the negative electrode plate and the separator are wound to a flat shape, and an upper surface 211 of the main body 21 formed by winding faces the insulating frame 6. Two ends of the base portion 63 in the length direction L are provided with first side edges 61 extending downwardly, each first side edge 61 abuts on the upper surface 211 of the main body 21 of the electrode assembly 2. The first side edges 61 of the insulating frame 6 abut on the upper surface 211 of the main body 21 of the electrode assembly 2, so the first side edges 61 can limit movement of the electrode assembly 2 in the up-down direction U when the secondary battery is vibrated or dropped, thereby avoiding the short circuit of the electrode assembly 2 and improving the safety performance of the secondary battery.

In the secondary battery according to the present disclosure, referring to FIG. 1, the electrode assembly 2 is provided as multiple in number, each first side edge 61 abuts on the upper surfaces 211 of the electrode assemblies 2 at the same time.

In the secondary battery according to the present disclosure, a ratio of an area of the upper surface 211 contacted with the first side edges 61 to a total area of the upper surface 211 ranges from 0.1 to 0.4. The main body 21 of the electrode assembly 2 is formed by winding the positive electrode plate, the negative electrode plate and the separator, and in order to ensure that the separator completely separates the positive electrode plate and negative electrode plate, edges of the separator need to be beyond the positive electrode plate and the negative electrode plate. If the area of the upper surface 211 contacted with the first side edges 61 is too small, the upper surface 211 will be subjected to a high pressure when the secondary battery is vibrated or dropped, and the first side edges 61 will bend the separator easily, which will lead to that the separator can not completely separate the positive electrode plate and the negative electrode plate and result in the short circuit of the electrode assembly 2. Therefore, it needs to ensure that the area of the upper surface 211 contacted with the first side edges 61 is large enough, thereby decreasing the pressure on the upper surface 211 exerted by the first side edges 61.

In the secondary battery according to the present disclosure, referring to FIG. 1 and FIG. 2, the base portion 63 is provided with a second side edge 62 extending downwardly, the second side edge 62 is positioned at an outer side of the first curve portion 43 in the width direction W, and the second side edge 62 is positioned between the first electrode tab 22 and the case 5, at least a part of the first bending portion 222 is positioned between the second side edge 62 and the first curve portion 43 in the width direction W. When a large number of electrode assemblies 2 are provided in the secondary battery, the first electrode tabs 22 need to be gathered and then fixed to the first connecting piece 3, so the second side edge 62 and the first curve portion 43 can function for gathering the first bending portions 222 of the first electrode tabs 22, thereby avoiding the movement of the first bending portions 222.

In the secondary battery according to the present disclosure, referring to FIG. 1 and FIG. 2, a rounded corner R is provided in a connecting portion between the base portion 63 and the second side edge 62, and the rounded corner R is formed in an inner wall of the insulating frame 6. In order to ensure an overcurrent area, the first electrode tab 22 is generally provided as multiple layers; the first bending portion 222 is bent downwardly along the curved outer wall of the first curve portion 43, so the first bending portion 222 positioned in the outer side of the curved outer wall will correspondingly forms a curved structure; at this time, if the inner wall of the connecting portion between the base portion 63 and the second side edge 62 has a right-angled structure, the first bending portion 222 positioned in the outer side of the curved outer wall will be easily caught in the right-angled structure and in turn be crushed. The rounded corner R is similar to the first bending portion 222 positioned in the outer side of the curved outer wall in shape, so the rounded corner R can limit the first bending portion 222 positioned in the outer side of the curved outer wall and avoid the first bending portion 222 being crushed.

In the secondary battery according to the present disclosure, referring to FIG. 1 and FIG. 2, the first protecting piece 4, the first connecting portion 221 and the first connecting piece 3 are fixed together by ultrasonic welding; an insulating adhesive G is adhered on a surface of the first protecting piece 4 facing the main body 21. In the production process and the working process of the secondary battery, the insulating adhesive G can avoid contact between the first protecting piece 4 and the main body 21, and prevent short circuit.

What is claimed is:

1. A secondary battery, comprising a cap plate, an electrode assembly, a case and a first protecting piece;
the cap plate comprising a first electrode terminal and a second electrode terminal which are opposite in electrical polarity;
the electrode assembly comprising a main body, a first electrode tab and a second electrode tab, the first electrode tab and the second electrode tab being provided to the main body and opposite in electrical polarity;
the main body of the electrode assembly comprising a positive electrode plate, a negative electrode plate and a separator provided between the positive electrode plate and the negative electrode plate, the first electrode tab being electrically connected with the first electrode terminal, and the second electrode tab being electrically connected with the second electrode terminal, the first electrode tab and the second electrode tab being not in contact with each other;
the case and the cap plate being assembled together and forming a closed receiving space with the electrode assembly being received in the closed receiving space;
wherein
the first electrode tab includes a first connecting portion and a first bending portion,
the first connecting portion is electrically connected with the first electrode terminal, and the first bending portion connects the main body of the electrode assembly and the first connecting portion;
the first protecting piece is fixed to a bottom of the first connecting portion;
the first protecting piece includes a main portion and a first curve portion, the first curve portion is connected with an outer end of the main portion in a width direction and is curved relative to the main portion; and
the first bending portion of the first electrode tab is bent downwardly along an outer wall of the first curve portion of the first protecting piece.

2. The secondary battery according to claim 1, wherein the first protecting piece further includes a first folding portion folded back onto the main portion, and the first curve portion connects the main portion and the first folding portion, the first folding portion, the first curve portion and the main portion form a U-shaped structure.

3. The secondary battery according to claim 2, wherein a width of the first folding portion is equal to a width of the main portion in the width direction.

4. The secondary battery according to claim 2, wherein the first protecting piece further includes a second curve portion, and the second curve portion is connected with an inner end of the main portion in the width direction and is curved relative to the main portion.

5. The secondary battery according to claim 4, wherein the first protecting piece further includes a second folding portion, the second folding portion is folded back onto the main portion, and the second curve portion connects the main portion and the second folding portion; the second folding portion, the second curve portion and the main portion form a U-shaped structure.

6. The secondary battery according to claim 5, wherein the second folding portion and the first folding portion are positioned at a side of the main portion in an up-down direction.

7. The secondary battery according to claim 5, wherein the secondary battery further comprises a first connecting piece connected between the first electrode tab and the first electrode terminal, and the first connecting portion is provided below the first connecting piece.

8. The secondary battery according to claim 7, wherein the first protecting piece, the first connecting portion and the first connecting piece are fixed together by ultrasonic welding;

an insulating adhesive is adhered on a surface of the first protecting piece facing the main body.

9. The secondary battery according to claim 8, wherein the second folding portion and the first folding portion are positioned at a side of the main portion close to the first connecting portion, and the second folding portion does not overlap the first folding portion in an up-down direction;

the insulating adhesive is adhered on the main portion.

10. The secondary battery according to claim 1, wherein the first electrode tab is provided as multiple layers.

11. The secondary battery according to claim 1, wherein at least a part of the outer wall of the first curve portion is curve.

12. The secondary battery according to claim 1, wherein the secondary battery further comprises an insulating frame, the insulating frame is received in the case and provided below the cap plate;

the positive electrode plate, the negative electrode plate and the separator are wound to a flat shape, and an upper surface of the main body formed by winding faces the insulating frame;

the insulating frame includes a base portion and first side edges, the first side edges respectively extend downwardly from two ends of the base portion in a length direction, each first side edge abuts on the upper surface of the main body of the electrode assembly.

13. The secondary battery according to claim 12, wherein a ratio of an area of the upper surface contacted with the first side edges to a total area of the upper surface ranges from 0.1 to 0.4.

14. The secondary battery according to claim 12, wherein the insulating frame further includes a second side edge extending downwardly from the base portion, the second side edge is positioned at an outer side of the first curve portion in the width direction, and the second side edge is positioned between the first electrode tab and the case, and at least a part of the first bending portion is positioned between the second side edge and the first curve portion in the width direction.

15. The secondary battery according to claim 14, wherein a rounded corner is provided in a connecting portion between the base portion and the second side edge, and the rounded corner is formed in an inner wall of the insulating frame.

* * * * *